June 30, 1936.  H. RÖSLE ET AL  2,045,615
HYDRAULIC DISENGAGING COUPLING
Filed April 17, 1930  4 Sheets-Sheet 1
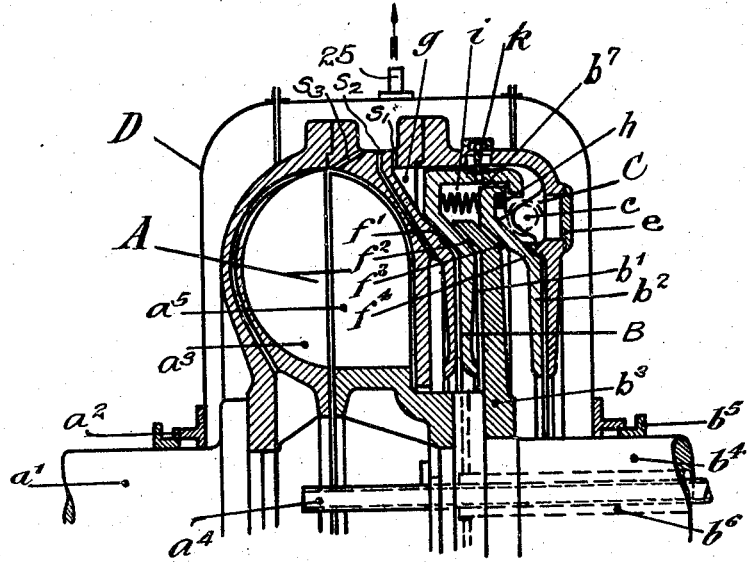
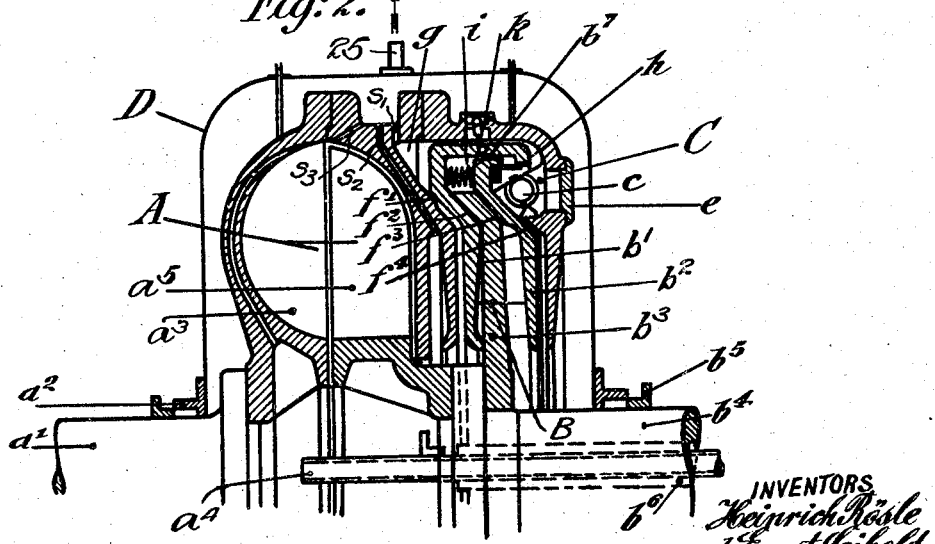
INVENTORS
Heinrich Rösle
and Ernst Seibold
BY C. F. Goepel
ATTORNEY.

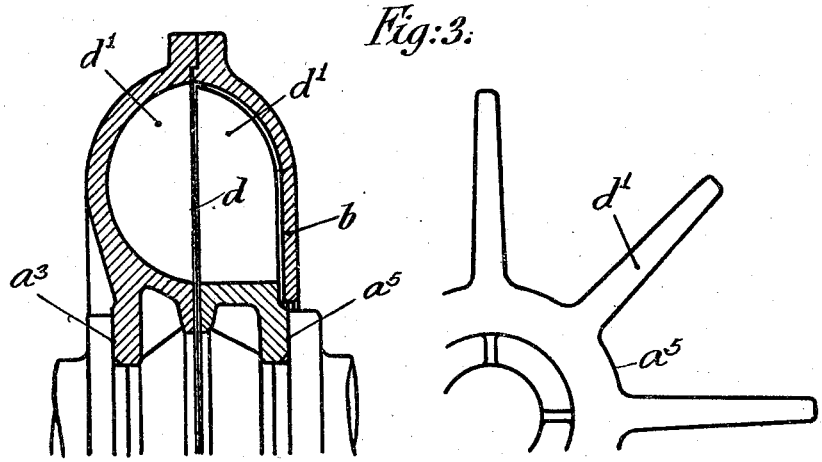
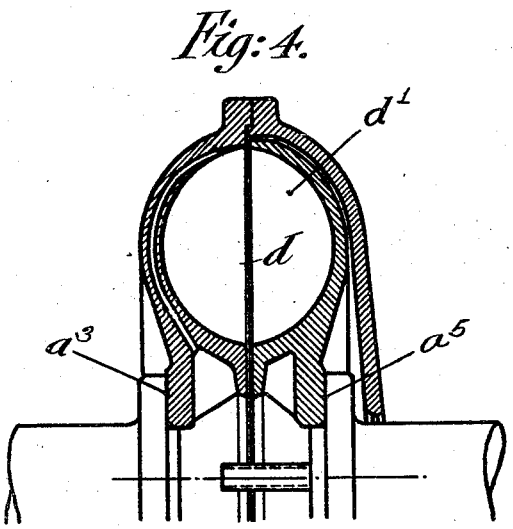

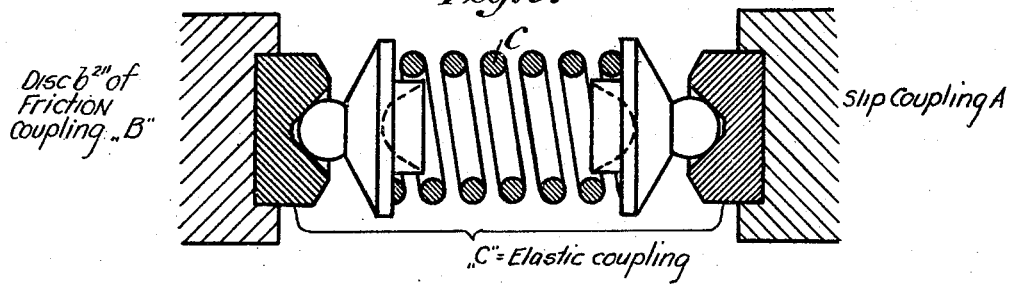
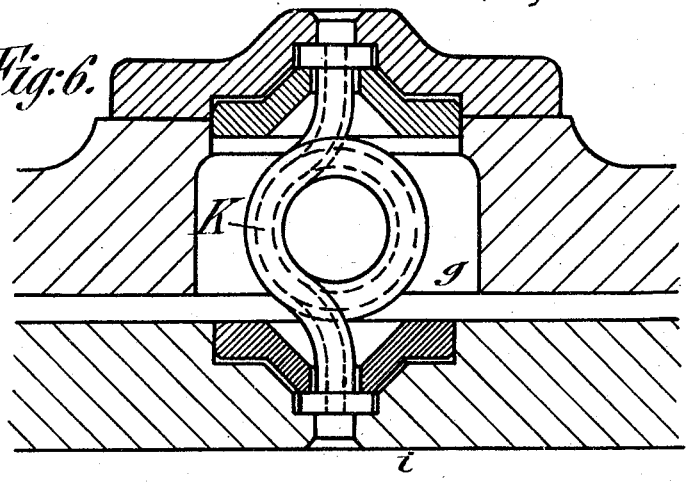
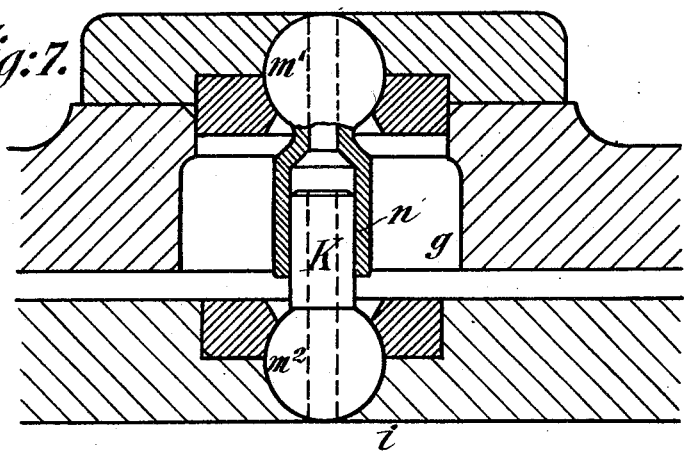

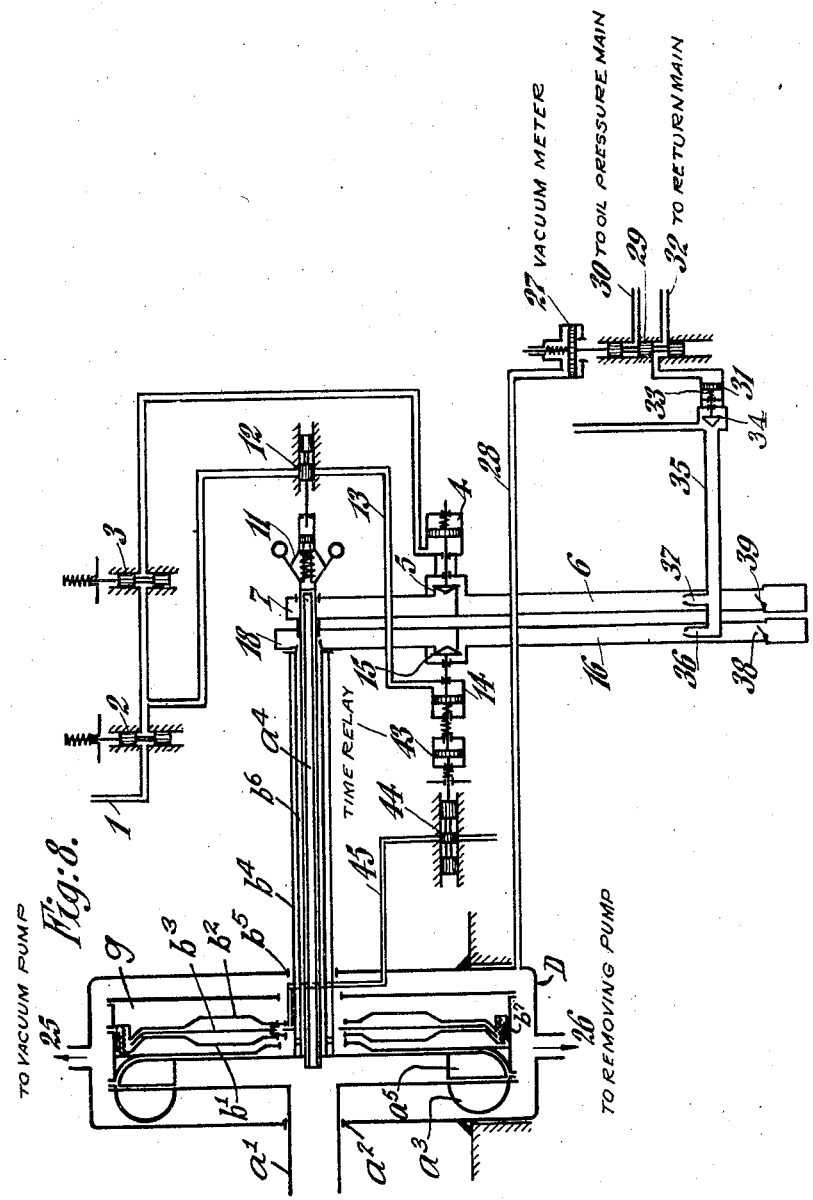

UNITED STATES PATENT OFFICE 2,045,615

HYDRAULIC DISENGAGING COUPLING

Heinrich Rösle and Ernst Seibold, Heidenheim, Germany

Application April 17, 1930, Serial No. 445,186
In Germany April 18, 1929

16 Claims. (Cl. 192—48)

This invention relates to coupling apparatus, and has for its general object and purpose to provide simple and compactly arranged means whereby large torques or turning moments may be transmitted without shock to the driving and driven parts.

It is a more particular object of the invention to provide coupling apparatus of this character embodying a hydraulically actuated non-flexible friction coupling in combination with a flexible coupling. We further contemplate the use as an additional element in the combination, of a hydraulically operated slip coupling.

It is an additional object of our invention to provide a single enclosing casing for the several coupling units which enables the apparatus to be employed in connection with driving and driven shafts of relatively short lengths and also simplifies the mounting or supporting of the several parts of the coupling.

It is an additional object of the present invention to provide an improved control means governing the supply of the hydraulic operating fluid whereby the hydraulic slip coupling is first automatically actuated and after reaching a certain secondary speed, the friction coupling is automatically actuated to assume the full turning moment in the transmission of power from the driving to the driven shaft.

With the above and other objects in view, the invention consists in the improved coupling apparatus, and in the form, construction and relative arrangement of its several parts as will be hereinafter more fully described, illustrated in the accompanying drawings, and subsequently incorporated in the subjoined claims.

In the drawings, wherein similar reference characters designate corresponding parts throughout the several views, Figures 1 and 2 illustrate a preferred embodiment of the improved coupling apparatus showing the several parts in engaged and disengaged positions respectively;

Figs. 3 to 7 inclusive, illustrate various detail parts of the apparatus, and

Fig. 8 is a diagrammatic view showing one embodiment of the automatic control means for the hydraulically actuated coupling units.

Referring in detail to the drawings, the driving shaft $a^1$ extends through a suitable stuffing box $a^2$ at one side of the casing or housing D which encloses the several coupling units. To said driving shaft within the casing the part $a^3$ of a hydraulic slip coupling A is secured. The disc $b^2$ of a hydraulically actuated friction coupling B is also connected with driving shaft $a^1$ through the medium of a flexible coupling C and axially displaceable relative to the revolving parts of A. The other friction disc $b^1$ is axially displaceable relative to the disc $b^2$ and is normally yieldingly held in disengaged position by a plurality of springs indicated at $b^7$ interposed between said discs adjacent their outer peripheries.

The driven shaft $b^4$ is provided with a bore which accommodates the hydraulic fluid supply pipes $a^4$ and $b^6$ for the admission of operating fluid for the hydraulic slip coupling A and the friction coupling B respectively. The driven shaft extends through a suitable stuffing box $b^5$ at the other side of the casing D. To the end of said driven shaft within the casing, the other part $a^5$ of the hydraulic slip coupling A is secured. The friction disc $b^3$ of the hydraulically operated friction coupling B is also secured to the driven shaft and is disposed between the friction plates or discs $b^1$ and $b^2$. These discs in their disengaged positions are balanced with respect to the part $a^3$ by contact with the beveled or conical surfaces $f^1$, $f^4$ of said part, and in their effective engaged positions by contact with the conical surfaces $f^2$, $f^3$ of the friction disc $b^3$. The outer peripheral parts of the friction plates or discs $b^1$ and $b^2$ are formed and arranged within the hydraulic fluid pressure chamber $g$ to form the space $i$, accommodating springs $b^7$, so that very simple packing may be employed in the clearance $h$ between said friction discs.

The small amount of water which may enter the space $i$ to counteract the pressure effect in chamber $g$ is continuously drained off through the flexible drainage conduit or pipe $k$. This may consist either of a simple flexible hose or pipe as shown in Fig. 6, or may be made in the form of telescopically engaged parts $n$ terminating in the balls or spheres $m^1$ and $m^2$ as shown in Fig. 7.

The connection of slip coupling A with friction coupling B is performed by the elastic coupling C illustrated in Fig. 5. In this figure, the elastic element, a spiral spring $c$, is clearly shown, together with the arrangement of the spring sockets at both ends of the spiral spring as well as the setting of said sockets in the respective members of the slip coupling A on the one hand and friction coupling B on the other hand. The same figure also illustrates how an axial displacement of disc $b^2$ relative to the revolving parts of A may take place.

In Figure 8 of the drawings, we have shown an automatic control means for the coupling apparatus above described. In this view, for the sake of clarity, the flexible coupling C has been omitted. As shown in this figure, in the hydraulic fluid supply pipe line 1, spaced devices 2 and 3 are interposed, suitably connected for automatic actuation in such a manner that device 2 is controlled by the turbine guide apparatus and/or the turbine sluice valve, while device 3 is under the control of the guide apparatus of the pump and/or the sluice valve in the delivery pipe of the pump. The pipe line 1 leads to a servomotor 4 which operates the valve 5 for the admission of the operating fluid through pipes or conduits 6, 7 and $a^4$ to the hydraulic slip coupling A. The centrifugal governor 11 on the driven shaft $b^4$ is connected with a valve 12 in the pipe line 13 which feeds the servomotor 14 operating valve 15 for the admission through conduits 16, 18 and $b^6$ of the operating fluid to the pressure chamber $g$ of the friction coupling.

The interior of the casing D is connected at 25 and 26 with a vacuum pump and pump for removing the operating fluid respectively. Connection 26 will not interfere with or prevent the development of a vacuum in casing D because of the special design of this pump, not shown in the drawings. Pipe 28 connects said casing with a vacuum meter 27, the piston of which controls valve 29 to close the oil admission conduit 30 and discharge conduit 32 respectively, of a servomotor 31. The piston of servomotor 31 which is influenced by the spring 33 operates a valve 34 and through the pipe or conduit 35 supplies pressure fluid to the two ejectors 36 and 37 arranged in conduits 16 and 6 respectively, to draw water past the check valves 38 and 39. For the purpose of lubricating the friction plates or discs $b^1$ and $b^2$ oil is supplied through the pipe 45 which is provided with control valve 44 operated by servomotor 14 through a time relay 43.

The part $a^5$ of the friction slip coupling is provided with spaced blades as shown in Fig. 3, and since the pressure in the space accommodating these blades, is higher than the outside pressure, if the space between said blades is closed on one side, as in Figure 4, the axial thrust on the part $a^5$ may become so great that the friction disc $b^3$ on the driven shaft will be displaced, and thus cause undesired binding of this disc against the loose friction disc or plate $b^2$. This of course, must be avoided, and therefore, the blades $d^1$ of the part $a^5$ are open on both sides in the axial direction within the enclosing walls $b$ of the part $a^3$ so that any excessive axial thrust on the part $a^5$ is avoided since the pressures in the axial direction are equally balanced within the part $a^3$.

In operation, when the control devices 2 and 3 are opened, hydraulic operating fluid is supplied to the coupling A, the rotation of the driving shaft and part $a^3$ producing eddies therein so that in a few seconds, the part $a^5$ is brought to a slipping rotating speed which is very near to the synchronous speed.

The friction plates $b'$ and $b^2$ partake in the rotation with the primary part $a^3$ by means of the elastic element $c$. As soon as the required speed of the part $a^5$ of the slip coupling is reached, the pressure chamber $g$ is filled with the hydraulic liquid around the two friction plates. A high centrifugal pressure is here produced, under the influence of which the two friction plates are forced towards each other against the action of the springs $b^7$ and are tightly pressed into frictional engagement with the plate $b^3$, rigidly connected to the secondary part $a^5$ and shaft $b^4$.

In order to release the coupled connection between the driving and driven shafts, it is only necessary to shut off the supply of pressure fluid. With the friction coupling engaged the operating fluid is in a constant flow through the coupling and through pipe $b^6$, and leaving partly through a number of holes $s^1$ and having a certain pre-determined area, while the remainder is drained off by the openings $s^2$ which, however, are so arranged that the operating fluid can leave by said openings only when the whole inner part of the coupling is completely filled so that the holes $s^2$ are draining off all the excess fluid which does not pass through the holes $s^1$. Naturally, when the supply of operating fluid is stopped, owing to the action of the centrifugal forces, all of the fluid inside the couplings is rather quickly forced out through the aforementioned openings and thus the action on the friction clutch is removed with the result that the friction is disengaged. Thereupon, the pressure chamber $g$ being very narrow, is quickly emptied so that the springs $b^7$ will overcome the centrifugal pressure and release the plates $b^1$, $b^2$ from frictional engagement with the disc $b^3$.

As water pressure is supplied through the pipe line 1 to the servomotor 4, the motor piston is operated to open the valve 5 so that water is drawn through the conduit 6 and pipe $a^4$ into the pressure chamber or room $d$ of the hydraulic slip coupling. After the part $a^5$ of this coupling has reached a certain speed of rotation, the centrifugal governor 11 on shaft $b^4$ opens the valve 12 so that the pressure water enters through the pipe 13 to the servomotor 14, the piston of which is actuated to move valve 15 to the open position. Water may now be drawn through the conduit 16 and pipe $b^6$ to the pressure chamber $g$ of the hydraulically actuated friction coupling. This drawing of the water into the pressure chambers of the two coupling units is caused by the high vacuum which is maintained within the casing D. Should this vacuum fail for any reason, the vacuum meter 27 which is balanced by a suitable spring and atmospheric pressure against the vacuum within the casing, is caused to operate, the piston thereof being moved by atmospheric pressure in the pipe line 28 connected with the casing D. Valve 29 on the one hand is connected to oil pressure main 30 and return main 32, while on the other hand a connection to the small piston valve 34 is provided for. The control pin of valve 29 being in rigid connection with 27 is designed so as, under normal operating conditions, to establish connection of pressure main 30 with the passage leading to the servomotor 31 with the result that by the action of the pressure oil, valve 34 is kept closed. This condition is maintained as long as normal conditions in the coupling casing D prevail, or in other words, as long as a vacuum is maintained in D and piston 27 stands in its upper position in which it is held by the vacuum on one side and the atmospheric pressure on the other side. Now, should the vacuum inside the casing D fail, piston 27 will move downward by the action of a spring on the upper side of the piston with the result that the control pin of valve 29 will now block the connection between 30 and the passage to 31, while on the other hand, connection between the servomotor 31 and the return main 32 is established with the result that the pressure on the piston is removed and valve 34 opened by the action of spring 33. The valve 29 is thereby operated so that it cuts off the admission of oil through conduit 30 to the servomotor 31 and opens the oil discharge pipe 32. The valve 34 which was held closed under the pressure of the oil is thus permitted to move to its open position under the influence of the spring 33 so that pressure water obtained from outside sources, preferably from the penstock of a turbine, or from that of a pump, not shown, may enter the pipe 35 and be delivered from the two ejectors 36 and 37. These ejectors thus operate to draw water from a suitable supply source past the check valves 38 and 39 which in the event of failure of the vacuum produced by these ejectors assume their closed positions.

Regarding the operation of valve-device 3, as has been clearly stated, it is to be noted that said valve-device 3 is under the control of the guide apparatus of the pump and/or the sluice valve in the delivery pipe. From this it is evident that the operation of valve-device 3 is dependent upon the operative state of the pump to which the coupling is connected.

The automatic operation of valve-device 3 is performed by the opening of the sluice valve and/or the guide apparatus of the pump with which the valve-device is connected in such manner that with open pump, the valve-device is closed while the closed sluice valve and/or guide apparatus of the pump valve-device 3 is open.

Opening of the pump sluice valve and/or guide apparatus in turn is initiated by the pressure which is built up with increasing speed during starting, by which on the other hand the governor also comes into action, with the engaged friction clutch, pump sluice valve and/or guide apparatus is opened while at the same time valve-device 3 is closed.

As soon as the friction coupling has been engaged and the full torque passes through the coupling after the pump sluice valve has been opened to the full, control valve 3 is automatically operated to shut off the further flow of pressure fluid through pipe line 1 so that there is no further supply of such fluid to the servomotor 4, the piston thereof returning to normal position and thus closing the valve 5 to prevent the supply of pressure fluid to the hydraulic slip coupling.

The servomotor 14 which controls the admission of pressure fluid for the operation of the hydraulic friction coupling through the time relay 43 remains connected with the supply pipe line 1 and opens communication between the friction coupling and the lubricant supply pipe 45 so that lubricant is supplied to the friction plates upon movement of said plates to their engaged or disengaged positions, and then cuts off further supply of the lubricant thereto.

From the above description, it is believed that the construction and manner of operation of the several parts of our improved coupling apparatus will be readily understood. It will be seen that we have provided an arrangement in which the three coupling units are compactly arranged and housed within a single casing and have also provided means for the positive and certain operation of these coupling units in properly timed relation which is entirely automatic in its action.

We have herein shown a practical embodiment of our present improvements which has been found highly efficient and reliable in its operation. Nevertheless, it is to be understood that the essential features of our present disclosure may also be incorporated in various other alternative structural forms, and we accordingly, reserve the privilege of resorting to all such legitimate changes therein as may be fairly incorporated within the spirit and scope of the invention as claimed.

We claim:

1. In combination with driving and driven members, power transmission coupling means therefor including an asynchronous hydraulic slip coupling, a hydraulically operated friction coupling, and a flexible coupling between a part of said friction coupling and one of said members, and a common enclosing casing for the slip coupling, the friction coupling and the flexible coupling.

2. In combination with driving and driven members, transmission coupling means therefor, including an asynchronous hydraulic slip coupling, and a hydraulically operated friction coupling, having a common enclosing casing for the slip coupling and friction coupling, and means for supplying pressure fluid under the influence of a vacuum within said casing for the operation of each of said couplings.

3. In combination with driving and driven members, transmission coupling means therefor, including an asynchronous hydraulic slip coupling and a hydraulically operated friction coupling in which the friction coupling includes a friction disc on the driven member and pressure plates cooperating therewith and axially movable relative thereto, and coacting surfaces balancing said plates on a part of the hydraulic slip coupling in the released positions of said plates and coacting surfaces on the plates and said friction disc balancing said plates in their effective coupling position.

4. In combination with driving and driven members, transmission coupling means therefor including an asynchronous hydraulic slip coupling and a hydraulically operated friction coupling, in which said friction coupling includes a friction disc on the driven shaft, and axially movable pressure plates at opposite sides thereof actuated to their engaged positions by hydraulic fluid pressure, the outer peripheral portions of said plates being formed to provide a space, yielding means in said space, urging the plates to their released position, and a single packed clearance between the edges of said plates.

5. In combination with driving and driven members, transmission coupling means therefor including an asynchronous hydraulic slip coupling and a hydraulically operated friction coupling, in which said friction coupling includes a friction disc on the driven shaft, and axially movable pressure plates at opposite sides thereof actuated to their engaged positions by hydraulic fluid pressure, the outer peripheral portions of said plates being formed to provide a space therebetween, spring means in said space urging the plates to their released positions, and a flexible water discharge connection to the outer edge portions of said friction pressure plates.

6. In combination with driving and driven members, an asynchronous hydraulic slip coupling, a flexible coupling, and a friction disc coupling mounted on the driven member having cooperative pressure plates axially movable thereto, and coacting means for balancing the plates in respective released and effective coupling positions.

7. A hydraulic coupling comprising means for transmitting power from a driving to a driven member including an asynchronous hydraulic slip coupling and a hydraulically operated friction coupling, a common enclosing casing for said slip and friction couplings, means for operating the slip coupling to drive the driven member at less than synchronous speed, means in connection with the driven member actuated at a pre-determined speed of said driven member to cause the friction coupling to assume full effective engagement whereby to operate the driven member at synchronous speed.

8. A hydraulic coupling comprising means for transmitting power from a driving to a driven member including an asynchronous hydraulic slip coupling and a hydraulically operated friction coupling, means for operating the slip coupling for driving the driven member at less than synchronous speed, means in connection with the driven member actuated at a pre-determined speed of said driven member to cause the friction coupling to assume full effective engagement whereby to operate the driven member at synchronous speed, means for operating said coupling units by fluid pressure, and means to open or cut off the fluid pressure supply for the respective coupling units.

9. A hydraulic coupling comprising means for transmitting power from a driving to a driven member including an asynchronous hydraulic slip coupling and a hydraulically operated friction coupling, means for operating the slip coupling to drive the driven member at less than synchronous speed, means in connection with the driven member actuated at a pre-determined speed of said driven member to cause the friction coupling to assume full effective engagement whereby to operate the driven member at synchronous speed, means for operating said coupling units by fluid pressure, means to open or cut off the fluid pressure supply for the respective coupling units, and a common enclosing casing for said coupling units having a vacuum therein whereby the pressure fluid is drawn into the respective coupling units.

10. A hydraulic coupling comprising means for transmitting power from a driving to a driven member including an asynchronous hydraulic slip coupling and a hydraulically operated friction coupling, means for operating the slip coupling to drive the driven member at less than synchronous speed, means in connection with the driven member actuated at a pre-determined speed of said driven member to cause the friction coupling to assume full effective engagement whereby to operate the driven member at synchronous speed, means for operating said coupling units by fluid pressure, means to open or cut off the fluid pressure supply for the respective coupling units, a common enclosing casing for said coupling units having a vacuum therein whereby the pressure fluid is drawn into the respective coupling units, auxiliary pressure fluid supply means for the coupling units, and means automatically operating in the event of failure of the means to actuate the auxiliary supply means and supply the operating fluid to the coupling units.

11. A hydraulic coupling comprising means for transmitting power from a driving to a driven member including an asynchronous hydraulic slip coupling and a hydraulically operated friction coupling, a common enclosing casing for said slip and friction couplings, means for operating the slip coupling to drive the driven member at less than synchronous speed, means in connection with the driven member actuated at a pre-determined speed of said driven member to cause the friction coupling to assume full effective engagement whereby to operate the driven member at synchronous speed, and means controlled by a time relay for supplying lubricant to said friction coupling.

12. A power transmission coupling having in combination with driving and driven elements, an asynchronous hydraulic slip coupling, a hydraulically operated friction coupling including a normally released pressure plate which is movable into effective coupling position, a casing in which the slip coupling and friction coupling are enclosed, means for supplying pressure fluid under the influence of a vacuum within the casing for the operation of each of said couplings, and means under the control of the speed of the driven element for moving said pressure plate into effective coupling position, said last-named means being effective when the driven element attains a predetermined speed.

13. In a power transmission coupling which includes an asynchronous hydraulic slip coupling having its cooperative parts connected respectively with driving and driven elements, the transmission coupling comprising a hydraulic friction coupling, a flexible part between the slip and hydraulic friction coupling, said hydraulic friction coupling comprising two axially displaceable pressure plates one of which is connected with the driving element through the medium of said flexible part, a friction plate secured to the driven shaft and disposed between said axially displaceable plates, the second of the axially displaceable plates being held normally displaced by yielding means, the said axially displaceable plates having peripheries shaped to form a space in which said yielding means is disposed for operation, and said second displaceable plate being arranged for movement against the yielding means into effective clutching position, and means in connection with the driven element actuated at a predetermined speed of said driven element for moving the said second displaceable plate against the yielding means and into effective clutching position.

14. A hydraulic coupling comprising means for transmitting power from a driving to a driven member including an asynchronous hydraulic slip coupling, a flexible coupling having one end connected with the slip coupling, a hydraulic friction coupling having an axially movable part normally released against the other end of the flexible coupling, a common enclosing casing for said couplings, valved means controlling the admission of working fluid for operating the slip coupling whereby to drive the driven member at less than synchronous speed, valved means controlling the admission of working fluid for moving said axially movable part into effective coupling engagement whereby to operate the driven member at synchronous speed, and means for automatically operating the last-named valved means including a centrifugal governor on the driven member adapted to be actuated at a pre-determined speed of said driven member.

15. In combination with driving and driven members, an asynchronous hydraulic slip coupling having primary and secondary elements connected respectively with said members, a hydraulic friction coupling connected between the primary element and the driven member and having a spring-urged normally released part, an elastic coupling acting between the slip coupling and the normally released part, means for admitting working fluid to the slip coupling for driving the driven member at less than synchronous speed, means for admitting working fluid to the friction coupling to force the normally released part into full coupling engagement for driving the driven member at synchronous speed, said last-named admission means being effective only after the secondary element has attained a given speed, and means for discharging flow from the friction coupling to permit automatic release of said normally releasable part.

16. In combination with driving and driven members, power transmission couplings therefor including an asynchronous hydraulic slip coupling having primary and secondary parts the radial blades of which have passages between them for permitting a balanced equilibrium of pressure in the pressure spaces and avoiding axial movement of the blades, a hydraulic friction coupling having a part connected with the driven member and a resiliently urged normally released part, a flexible coupling arranged to act between said normally released part and said slip coupling, and a casing common to all of said couplings enclosing the same.

HEINRICH RÖSLE.
ERNST SEIBOLD.